Figure 1:
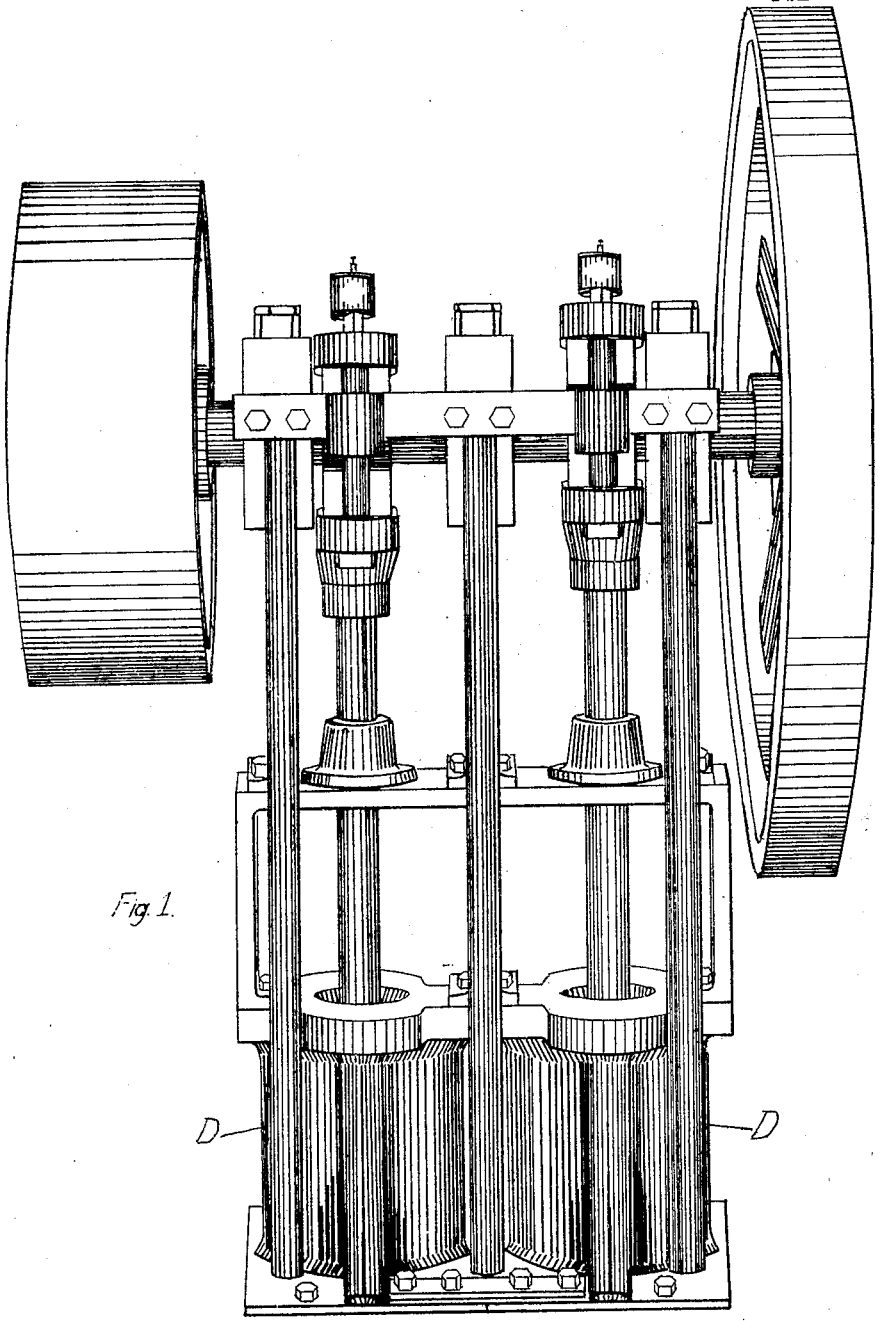

No. 796,508. PATENTED AUG. 8, 1905.
J. O. GREEN & H. T. MARTIN.
PEAT AND ARTIFICIAL FUEL MACHINE.
APPLICATION FILED MAR. 14, 1904.

2 SHEETS—SHEET 1.

Witnesses.
H. J. O'Connor
P. Schinger

Inventors
James O. Green
Harry T. Martin
per Edwin T. Coss
Attorney.

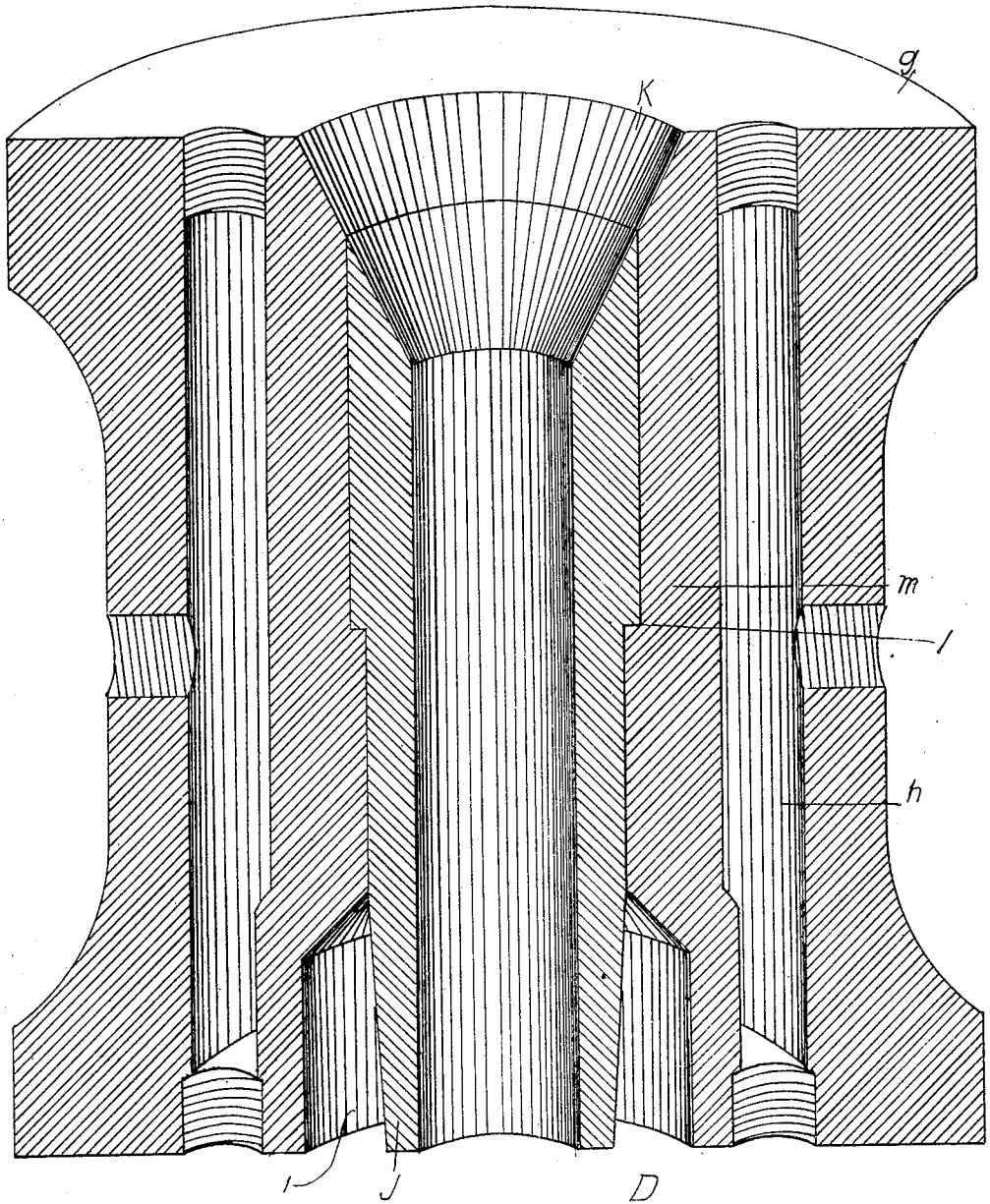

UNITED STATES PATENT OFFICE.

JAMES OSCAR GREEN, OF WHITEWATER, AND HARRY TALBOT MARTIN, OF BELOIT, WISCONSIN.

PEAT AND ARTIFICIAL-FUEL MACHINE.

No. 796,508.     Specification of Letters Patent.     Patented Aug. 8, 1905.

Application filed March 14, 1904. Serial No. 197,916.

*To all whom it may concern:*

Be it known that we, JAMES OSCAR GREEN, residing at the city of Whitewater, in the county of Walworth, and HARRY TALBOT MARTIN, residing at the city of Beloit, in the county of Rock, in the State of Wisconsin, citizens of the United States, have invented certain new and useful Improvements in Peat and Artificial-Fuel Machines, of which the following is a specification.

This invention relates especially to dies used in such machines; and the objects thereof are to provide a more efficient die, as illustrated in the accompanying drawings, in which—

Figure 1 is a peat-machine showing our improvements in place, and Fig. 2 is a sectional view showing the die.

Similar letters refer to similar parts throughout the views.

The die D consists of a cylinder $g$, having an interior chamber $h$ extending around an inner core $m$, with an opening in the center to receive and hold the tube $j$, and having the feed end enlarged to form a hopper $k$ and the discharge end enlarged to form a chamber $i$ about that end of the tube, giving easy access to the same. The tube $j$ has the interior of the feed end enlarged to form a continuation of the hopper $k$ and fits closely in cylinder $g$ and is held in place by a small projection $l$ or in any other suitable manner. The cylinder $g$ may rest upon any suitable base in the frame of the machine, or it may be enlarged to form the base for the machine, as shown in Fig. 1.

Having thus described our invention, what we claim as new, and desire to secure by Letters Patent, is—

1. The cylinder $g$ for a die for peat or artificial-fuel machines having a closed chamber $h$ surrounding an inner core $m$ and a central opening not communicating with the chamber enlarged to form a hopper at the feed end and also enlarged to form a chamber about the discharge end of the inner tube, substantially as described.

2. A die for peat or artificial-fuel machines consisting of a cylinder having a closed chamber surrounding an inner core, a central opening not communicating with the chamber, enlarged to form a hopper at the feed end and enlarged to form a chamber about the discharge end of the inner tube and an inner tube enlarged at the feed end to form a continuation of the hopper and projecting into the chamber at the lower end of the cylinder.

3. In a die for peat or other artificial-fuel machine, the combination of a cylinder with the central opening enlarged at each end, with an inner tube substantially as described.

4. The combination in a peat or other artificial-fuel machine of a die consisting of a cylinder having a chamber surrounding an inner core with an opening enlarged at the feed end to form a hopper and at the discharge end to form a chamber about the inner tube, an inner tube enlarged at the feed end to form a continuation of the hopper and projecting below into the chamber of the cylinder, with the frame and other parts of the machine as herein shown and described.

In witness whereof we have hereunto subscribed our names to this specification, this 8th day of March, A. D. 1904, in the presence of two witnesses.

JAMES OSCAR GREEN.
    HARRY TALBOT MARTIN.

Witnesses:
    FRANK N. FRYER,
    PETER L. WILLIAMS.